(12) United States Patent
Solomon et al.

(10) Patent No.: US 10,041,804 B2
(45) Date of Patent: Aug. 7, 2018

(54) INFORMATION DEVICE FOR A VEHICLE DRIVER AND METHOD FOR CONTROLLING SUCH A DEVICE

(75) Inventors: Aaron Solomon, Villejuif (FR);
Jean-Baptiste Poix, Le Kremlin Bicetre (FR)

(73) Assignee: Mobile Devices Ingenierie, Villejuif (FR)

( * ) Notice: Subject to any disclaimer, the term of this patent is extended or adjusted under 35 U.S.C. 154(b) by 332 days.

(21) Appl. No.: 12/956,594

(22) Filed: Nov. 30, 2010

(65) Prior Publication Data

US 2011/0138276 A1    Jun. 9, 2011

(30) Foreign Application Priority Data

Dec. 3, 2009   (FR) .................................... 09 58640

(51) Int. Cl.
*G01C 21/36* (2006.01)
*G06F 3/0481* (2013.01)
*G06F 3/0488* (2013.01)

(52) U.S. Cl.
CPC ......... *G01C 21/36* (2013.01); *G01C 21/3664* (2013.01); *G06F 3/0481* (2013.01); *G06F 3/0488* (2013.01); *G06F 2203/04803* (2013.01)

(58) Field of Classification Search
CPC .......... G06F 3/0488; B60K 2350/1024; B60K 2350/901; B60K 2350/1004; G01C 21/3664; G01C 21/20
USPC .................................. 715/702; 701/432, 418
See application file for complete search history.

(56) References Cited

U.S. PATENT DOCUMENTS

| 6,006,161 | A  | * | 12/1999 | Katou ........................... 701/410 |
| 7,165,228 | B2 | * | 1/2007  | Taylor et al. ................. 715/788 |
| 7,965,177 | B2 | * | 6/2011  | Kobayashi ............ B60K 35/00 |
|           |    |   |         | 340/438 |
| 7,999,721 | B2 | * | 8/2011  | Orr ................................ 342/20 |
| 2001/0005866 | A1 | * | 6/2001 | Shimotani et al. ........... 709/327 |
| 2005/0055154 | A1 | * | 3/2005 | Tanaka et al. ................ 701/200 |
| 2005/0267676 | A1 | * | 12/2005 | Nezu et al. .................. 701/200 |
| 2007/0101290 | A1 |   | 5/2007  | Nakashima et al. |
| 2007/0180407 | A1 | * | 8/2007  | Vahtola ......................... 715/847 |
| 2007/0186177 | A1 | * | 8/2007  | Both ................... G06F 3/04817 |
|           |    |   |         | 715/764 |

(Continued)

FOREIGN PATENT DOCUMENTS

EP    2 112 583    10/2009

OTHER PUBLICATIONS

French Search Report dated Jul. 22, 2010 for Application No. FR 0958640.

*Primary Examiner* — Christopher J Fibbi
(74) *Attorney, Agent, or Firm* — Frost Brown Todd LLC

(57) ABSTRACT

Information device for a vehicle driver comprising at least one electronic central unit linked to a display screen and to geolocating means, and the electronic central unit simultaneously running an operating system and a plurality of applications including at least one geolocated application. At least one first application is adapted to be displayed on the screen while defining a window adapted to present a display controlled by a second application, the first application allowing or not allowing the possibility of having this window displayed and controlling only the size and the position of this window, whereas the second application controls the content of the window.

18 Claims, 6 Drawing Sheets

(56) References Cited

U.S. PATENT DOCUMENTS

| | | |
|---|---|---|
| 2007/0222769 A1* | 9/2007 | Otsuka et al. ................. 345/173 |
| 2007/0250842 A1* | 10/2007 | Pinkus ................... G01C 21/26 |
| | | 719/328 |
| 2008/0016443 A1 | 1/2008 | Hiroshima et al. |
| 2008/0115064 A1* | 5/2008 | Roach et al. ................. 715/730 |
| 2008/0211654 A1* | 9/2008 | Kasamatsu .................. 340/461 |
| 2008/0215240 A1 | 9/2008 | Howard et al. |
| 2009/0265662 A1 | 10/2009 | Bamford |
| 2010/0125806 A1* | 5/2010 | Igeta ............................ 715/770 |

* cited by examiner

INFORMATION DEVICE FOR A VEHICLE DRIVER AND METHOD FOR CONTROLLING SUCH A DEVICE

TECHNICAL FIELD

The present invention relates to information devices for vehicle drivers and to the methods for controlling such devices.

BACKGROUND OF THE INVENTION

More particularly, the invention relates to an information device for a vehicle driver comprising at least one electronic central unit linked to a display screen and to geolocating means, and the electronic central unit simultaneously running an operating system and a plurality of applications including at least one geolocated application.

The document US-A-2008/215240 describes an example of a device of this type.

One of the aims of the present invention is to refine the devices of the abovementioned type, notably to enable several applications currently running to coexist on one and the same screen, while allowing independence between said applications.

To this end, the invention notably proposes an information device for a vehicle driver comprising at least one electronic central unit linked to a display screen and to geolocating means, and the electronic central unit simultaneously running an operating system and a plurality of applications, including at least one geolocated application, characterized in that at least one first application of said plurality of applications is adapted to be displayed on the screen while defining at least one window adapted to present a display controlled by a second application of said plurality of applications, said first application allowing or not allowing the possibility of having this window displayed and controlling only the size and the position of this window, whereas the second application controls the content of said window.

By virtue of these arrangements, it is possible to show, in the display of the first application, information concerning the second application or a virtual button or any other graphical object having an action on the second application, and do so without the first application needing to know how the second application is operating.

In embodiments of the method according to the invention, it is, if necessary, possible also to make use of one and/or the other of the following arrangements:

said second application also controls the actual display of the window;

the display screen is a touch screen and said second application is adapted to also control an action following a touch actuation by a user, of a graphical object displayed in said window;

the graphical object displayed in said window is a shortcut and said second application is adapted to be displayed on at least a portion of the screen following a touch actuation of said shortcut by a user;

said window is adapted to display information communicated by the second application with a certain priority level, and the first application is adapted to allow the display of the window if said priority level is greater than a certain threshold priority level and to reject the display of the window if said priority level is below a certain threshold priority level;

the display screen is a touch screen and the device also includes means of calling the control panel adapted to have a control panel displayed on the screen comprising at least a menu of the applications and a display control area, the menu of the applications comprising graphical objects designating said applications and the display control area comprising placement areas, the operating system being designed for a user to be able to drag a graphical object representative of an application from the menu of the applications and place said graphical object in one of the placement areas, each of said placement areas corresponding to a predetermined display type;

the operating system is adapted to have the control panel displayed on the screen overlaid on data previously being displayed;

the operating system is designed to have displayed, in different screen portions, applications whose representative graphical objects are respectively placed in the placement areas of the display control area;

the operating system is designed to have an application whose representative graphical object is placed in one of the placement areas of the display control area displayed immediately, said application being displayed according to the display type corresponding to said placement area and the control panel initially remaining overlaid on said application;

the display control area includes at least first and second placement areas, the first and second areas respectively corresponding to displays of applications on two complementary screen portions;

the screen is rectangular and has a smaller dimension, the two complementary screen portions sharing the screen according to a line of separation parallel to the smaller dimension of said screen and the operating system is designed for a user to be able to drag the line of separation by touch laterally toward one of the two screen portions, until the current application is made to disappear from this screen portion and to show only the current application on the other screen portion;

the first and second placement areas respectively occupy the two complementary screen portions;

the display control area also includes a third placement area and the operating system is designed to display, in full screen mode, an application whose representative graphical object is placed in said third placement area;

said third placement area forms a boundary between the first and second placement areas.

Moreover, another subject of the invention is an information device for a vehicle driver comprising at least one electronic central unit linked to a touch display screen and to geolocating means, and the electronic central unit simultaneously running an operating system and a plurality of applications including at least one geolocated application, the device also including means for calling the control panel (voice command, physical button or virtual button) adapted to display a control panel on the screen, characterized in that the control panel includes at least a menu of the applications and a display control area, the menu of the applications comprising graphical objects designating said applications and the display control area including placement areas, the operating system being designed for a user to be able to drag a graphical object representative of an application from the menu of the applications and place said graphical object in one of the placement areas, each of said placement areas corresponding to a predetermined display type.

The invention also relates to a method for controlling a device as defined hereinabove, in which:

an operating system and a plurality of applications including at least one geolocated application are made to run simultaneously on the central unit, at least one first application of said plurality of applications is displayed on the screen of the personal navigation device, while defining at least one window adapted to present a display controlled by a second application, said first application allowing or not allowing the possibility of displaying this window and controlling only the size and the position of this window, whereas the second application controls the content of said window.

Another subject of the invention is:

a computer program comprising instructions for implementing the above method, when these instructions are run by a processor;

and a machine-readable data medium comprising such a computer program.

BRIEF DESCRIPTION OF THE DRAWINGS

Other features and advantages of the invention will become apparent from the following description of one of its embodiments, given as a nonlimiting example, in light of the appended drawings.

In the drawings.

MORE DETAILED DESCRIPTION

In the various figures, the same references designate identical or similar elements.

Figure 1:
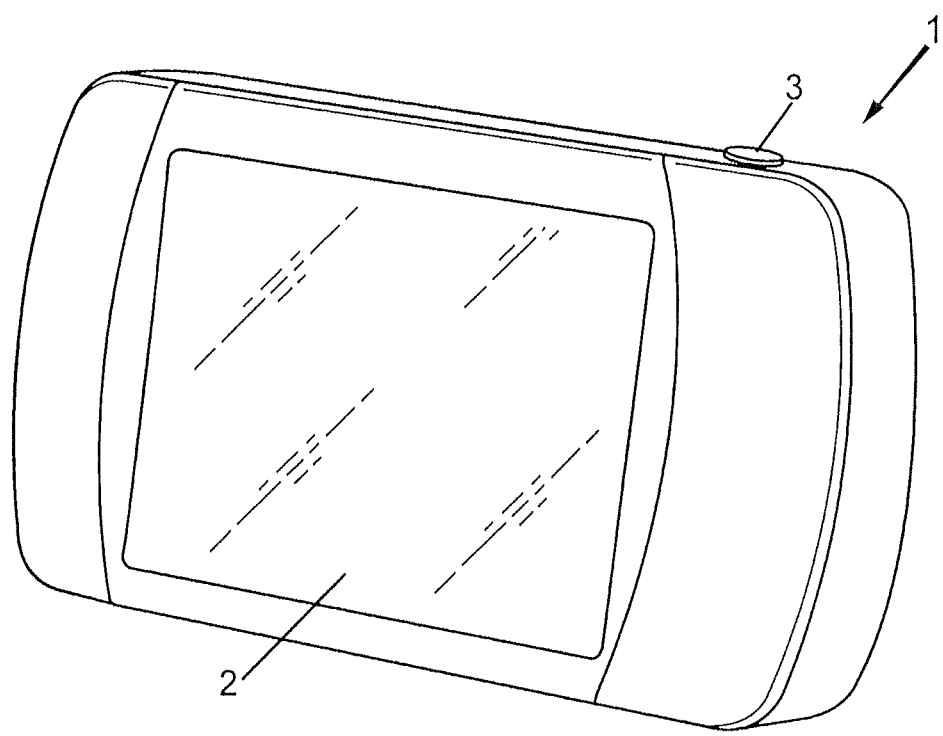
FIG. 1 is a perspective diagrammatic view of a personal navigation device according to one embodiment of the invention.

FIG. 1 shows an information device 1 for a vehicle driver, for example a personal navigation device, intended to be used notably in a motor vehicle by the driver, to assist him in his directions and to communicate a variety of information to him.

This information device 1 may possibly be presented in the form of a hand-held or similar unit, provided notably with:

an electronic screen 2, for example a rectangular or other shape touch screen, and an on/off button 3 that can also be used, in the example considered here, as a call button for the control panel, as will be explained hereinbelow.

Figure 2:
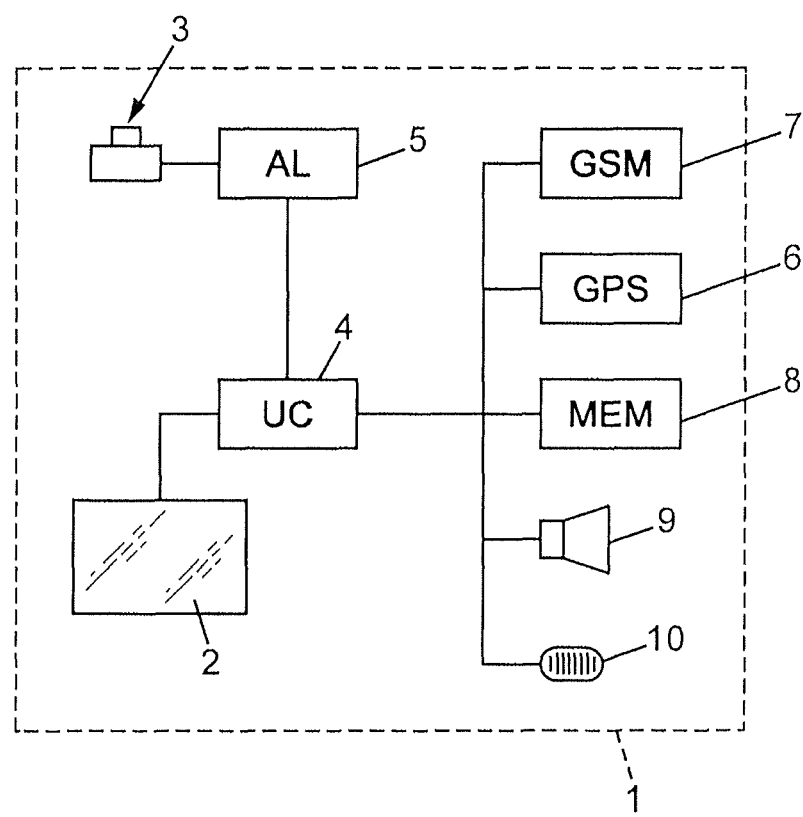
FIG. 2 is a simplified block diagram of the personal navigation device of FIG. 1, and FIGS. 3 to 9 are examples of displays that may be presented on the screen of the personal navigation device of FIG. 1.

As represented in FIG. 2, the personal navigation device 1 may notably include an electronic central unit 4 (UC) which is powered by an electrical power supply 5 (AL) which is in turn controlled by the on/off button 3, the electronic central unit 4 controlling and/or receiving information from various modules, notably:

the touch screen 2, a GPS module 6 or other geolocating module, where appropriate, a GSM module 7 or other mobile telephony module, a memory 8 (MEM), a loudspeaker 9, a microphone 10, etc.

Several programs are run permanently in parallel on the electronic central unit 4, notably:

an operating system, and a plurality of applications including at least one geolocated application (for example, a geolocated navigation application) using the data supplied by the geolocating module 6, and other applications such as, for example:

a configuration application, for example for configuring the operation of the personal navigation device 1, a mobile telephony application, an instant messaging application, for example for sending and receiving SMSs, an electronic mail application, a weather information application, etc.

Figure 3:
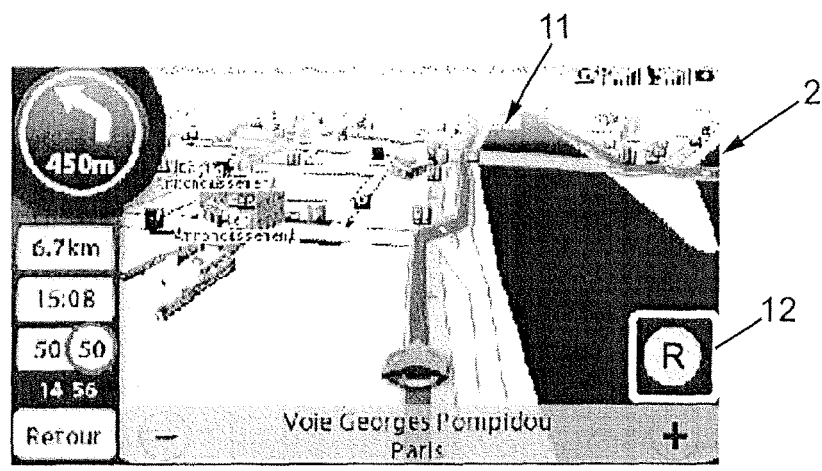

The navigation application may, for example, be displayed on the screen 2 in a full screen display 11, as represented in FIG. 3, to give the user information such as his position on a map, direction indications for reaching a desired destination, etc.

Furthermore, this navigation application, since all or some of the other applications may be displayed on the screen 2, may determine a certain number of permanent or non-permanent windows on the screen 2, which are reserved for other applications and in which these other applications can show a display. It will be noted that the content of these windows is independent of the current application, and entirely controlled by said other applications. Similarly, when these windows are not permanent, their appearance may be controlled by the application or applications to which they correspond, as will be explained in more detail hereinbelow.

Thus, in the example of FIG. 3, the navigation application reserves a window for the radar signaling application. Said radar signaling application is adapted to show, for example, a symbol or any other fixed or variable display in said window, to be used as a shortcut 12 for calling the radar signaling application to the screen 2.

Thus, when a user touches the shortcut 12 with his finger, the operating system shows the radar signaling application on the screen 2, for example in full screen mode or on a portion of the screen. For example, an actuation of the shortcut 12 of the radar signaling application by the user may reveal a display of two windows forming shortcuts 21, 22 that can be seen in FIGS. 6 and 9, that the user can actuate by touch to signal to a remote server the presence of a radar, respectively in the reverse direction or in the forward direction of the vehicle.

Obviously, the display of such shortcuts may be provided in a first application, possibly other than navigation, in order to have an action toward a second application. Since these shortcuts are controlled by the second application, the graphical object presented in the window 12 may possibly be animated. For example, a shortcut to the navigation application may present a small portion of a road map corresponding to the place where the device 1 is currently located, or directional arrows indicating to the user whether he should turn left or right.

Figure 4:
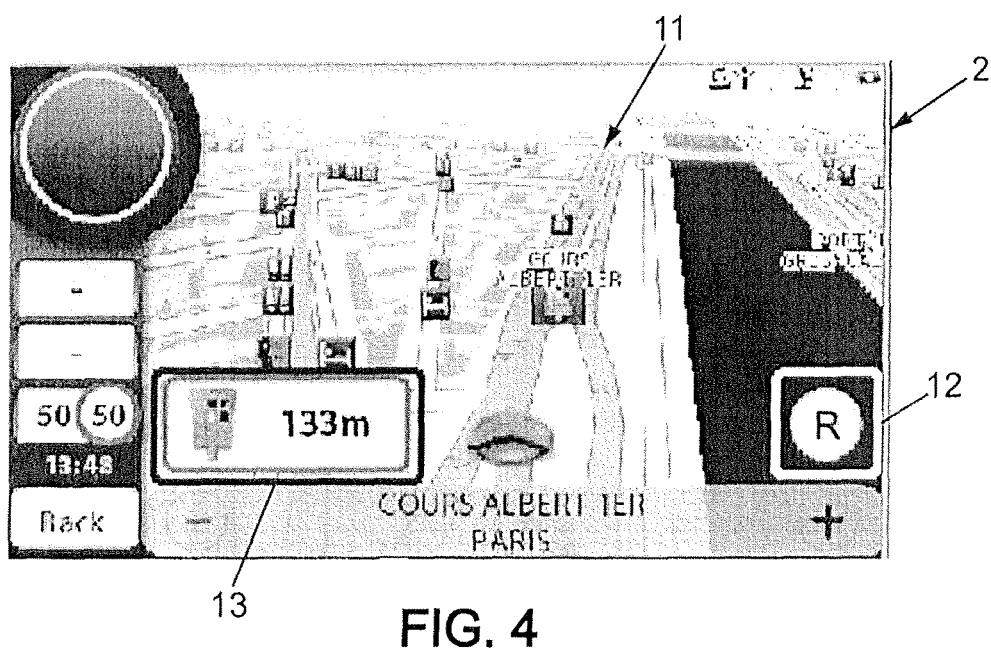

As represented in FIG. 4, the navigation application, or any other application currently being displayed, may also include predefined windows 13 in which alerts according to certain events may appear. These windows may possibly not be permanent, but appear on the screen 2 only when the application corresponding to said window shows an alert.

As an example, as can be seen in FIG. 4, the navigation application may include a predefined window 13 which may not appear in normal conditions (thus, this window does not appear in FIG. 3), but which appears, for example, when the vehicle in which the personal navigation device 1 is installed approaches a road control radar: in this case, the radar signaling application activates the window 13 and shows an alert therein, which, in the example considered, may consist, for example, in the display of a symbol diagrammatically representing a traffic radar associated with the distance remaining to be traveled before arriving at this traffic radar.

The first application, here the navigation application, may allow or not allow the window 13 to appear according to the current conditions of display or the operational conditions of the first application, whenever the second application whishes to display a content in the window 13.

The alerts emitted by each application may possibly be assigned a priority level (for example, an integer number between 1 and 4 to designate a priority level that increases with this integer number). The application currently displayed may determine a threshold priority level below which the alerts from the other applications should not be displayed on the screen 2. If necessary, this threshold priority level may be determined by the user, for example by means of the configuration application.

It will be noted that the position of the abovementioned windows 12, 13 may possibly be chosen by the user, for example by means of the configuration application. Furthermore, said windows may appear on the screen 2 either by totally masking any other element of the display of the application currently displayed situated in correlation with said windows, or by being merged in said display, that is to say by being partially masked by certain elements of this display.

Obviously, it remains possible to force a window to the foreground of an application currently being displayed independently of any predefined window in the application currently being displayed, notably to display a message with a high degree of priority.

According to another aspect of the invention, the first and second applications may use Java or C++ source code. Further, said first and second applications may exchange objects like inter-applications messages to transmit information to one another. In particular, the second application (for example the radar signaling application) may use an inter-application message to notify the first application (the navigation application) about the content of the predefined window (13) to be displayed in the window (13), this inter-application message including static or dynamic graphical objects.

Similarly, the second application may use an inter-application message to notify the first application about the shortcut (12) or the shortcuts (12) to be displayed in the displayed window of the first application display, this inter-application message also including static or dynamic graphical objects.

Moreover, the personal navigation device also includes call means for the control panel, comprising, for example, the abovementioned on/off button 3, or any other physical button, or even a virtual button formed by a predetermined area of the touch screen 2. In a variant, these call means for the control panel could possibly consist of a voice command.

When the user of the device 1 actuates these call means for the control panel, for example by a brief press on the abovementioned button 3 (a long press switches off the device 1), the operating system displays a control panel on the screen 2, preferably overlaid on the previously current display (in this case, the display 9 of the navigation application in the example considered here).

Figure 5:
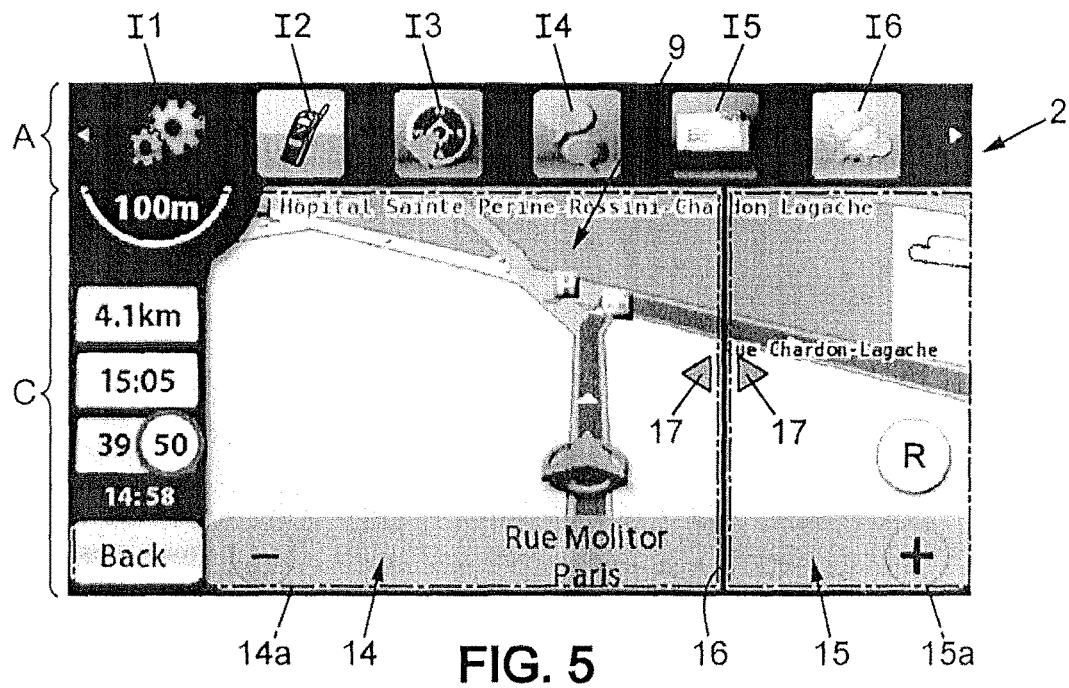

As represented in FIG. 5, the control panel comprises at least a menu of the applications A and a display control area C.

The menu of the applications A may consist, for example, of a strip extending over the entire width of the screen 2. In this menu, applications A are displayed by the icons I1-I6, representative of various applications which run parallel on the central unit 4 and that the user can have displayed on the screen 2, as will be explained hereinbelow.

These icons I1-I6, or any other graphical objects symbolizing the applications, may be juxtaposed horizontally in the menu of the applications A and said menu of the applications A may possibly be designed for a user to be able to horizontally drag these various icons by horizontally sweeping said menu of the applications A with a finger, if all the icons I1-I6 cannot be displayed at the same time in the menu of the applications A.

These icons I1-I6 may correspond, for example, among other things, to:
  the configuration application (icon I1),
  the mobile telephony application (icon I2),
  the geolocated navigation application or other geolocated application (icon I3),
  the instant messaging application (icon I4),
  the electronic mail application (icon I5),
  the weather information application (icon I6), etc.

The display control area C comprises two placement areas 14a, 15a, which correspond to two screen portions 14, 15 separated by a line of separation 16, parallel to the small side of the screen 2. The screen portion 14 may represent, for example, between ⅔ and ¾ of the width of the screen 2, and the screen portion 15 represents the rest of the width of the screen 2.

Advantageously, the operating system is designed for a user to be able to move the line of separation 16 by placing a finger on this line of separation and by moving this finger horizontally according to one or other of the arrows 17, to modify the respective widths of the first and second screen portions 14, 15, or even to make one of the two screen portions disappear totally, which can be obtained by moving the line of separation 16 to the immediate vicinity of one of the two lateral edges of the screen 2.

Figure 6:
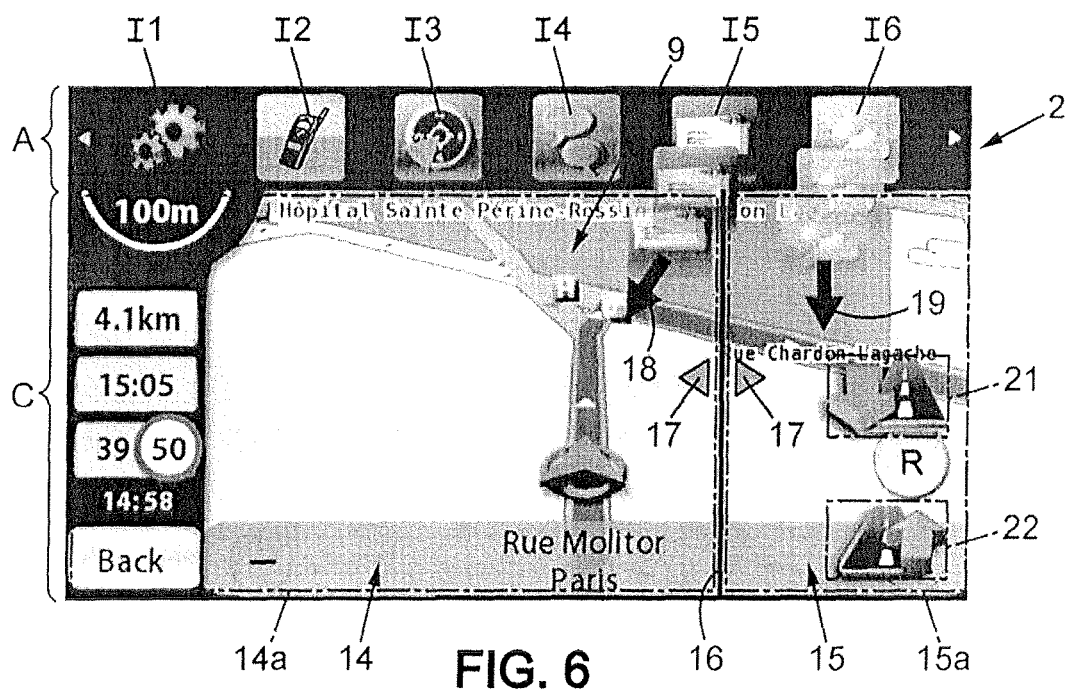

As represented in FIG. 6, when the control panel is displayed, a user can call to the screen one or two of the applications belonging to the menu of the applications A.

As an example, if the user wants to replace the navigation application, initially displayed in full screen mode, with a display of emails in the first screen portion and a display of weather information in the second screen portion, he successively drags each of the icons I5 and I6 from the menu of the applications A respectively into the placement areas 14a, 15a, as symbolized by the arrows 18, 19 in FIG. 6 (the user performs this operation conventionally by placing his finger on each of the icons I5, I6, and by dragging his finger to the desired area 14a or 15a, after which the user removes his finger for the placement of the application concerned to take effect).

Once these two operations have been carried out, the electronic mail application is displayed in the first screen portion 14 and the weather information application is displayed in the second screen portion 15 (in the particular example considered here), with the control panel in overlay mode. The user can then make the control panel disappear by applying a brief impulse to the button 3, or simply by waiting for the control panel to disappear by itself, which occurs after a predetermined time without any action from the user on the control panel.

Figure 7:
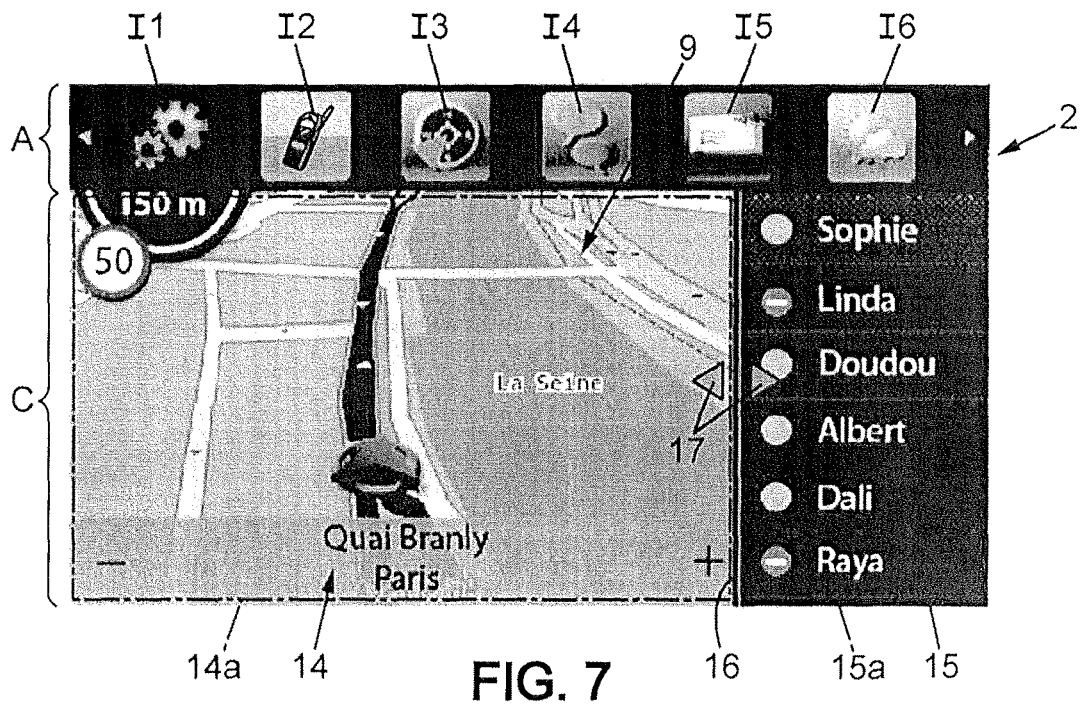
Figure 8:
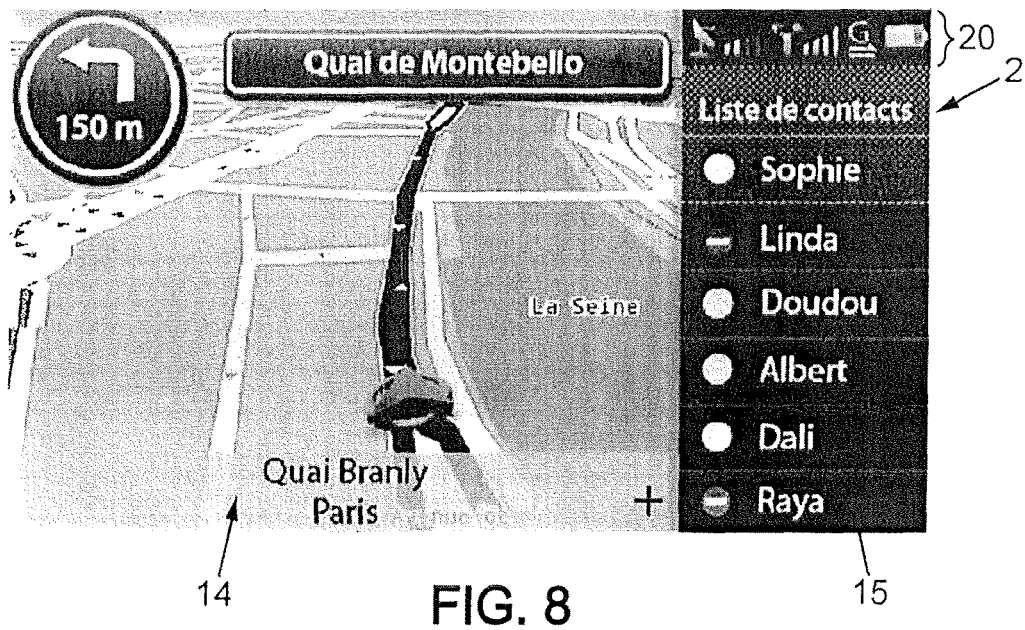

Thus, assuming that, while displaying the control panel, the user has chosen to show the navigation application in the first screen portion 14 and the instant messaging contacts in the second screen portion 15, these two applications are displayed in the two screen portions 14, 15 firstly with the configuration panel in overlay mode (FIG. 7), then without the control panel in overlay mode (FIG. 8).

Obviously, the user can thus show any two applications out of all the applications in the menu A. If necessary, some of these applications may be designed to be displayed only in full screen mode or only on the large screen portion 14 or only on the small screen portion 15: in this case, the actual display on the screen 2 is automatically adapted according to these constraints, if the choice of the user is not compatible with these constraints.

Moreover, the user may, if necessary, choose to have an application displayed in full screen mode, either by making one of the two screen portions 14, 15 disappear, as explained hereinabove, by moving the line of separation 16, or by placing the icon of the chosen application directly on the line of separation 16 or in its immediate vicinity.

It will be noted that, in the particular case of FIG. 8, the application presented in the second screen portion 15 has a status bar 20 in the top portion, giving a variety of information concerning the operation of the personal navigation device 1 (electromagnetic signal reception quality, state of charge of batteries, etc.). This status bar may, depending on the applications displayed, be displayed either over the entire width of the screen 2, or over the width of one of the screen portions 14, 15, or not be displayed at all.

Figure 9:
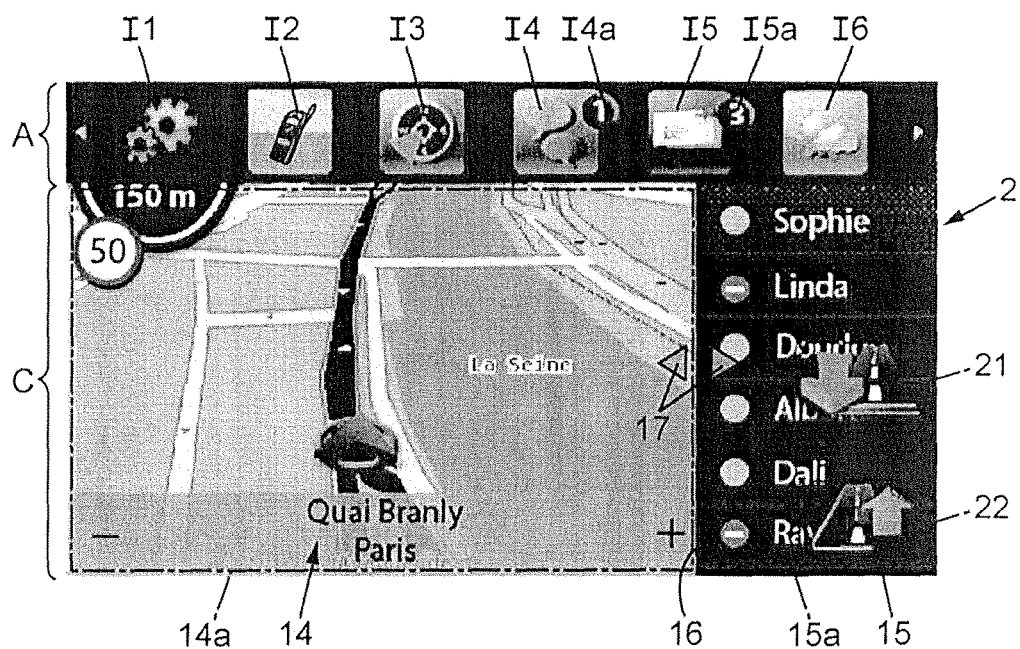

Finally, as represented in FIG. 9, the menu of the applications A may advantageously show, associated with each of the icons I1-I6, numbers of currently pending notifications, displayed, for example, in bubbles I4a, I5a which appear partially overlaid on the corresponding icons, in this case I4, I5. In the example of FIG. 9, these pending notifications are respectively a number of messages pending for instant messaging and a number of emails pending.

The invention claimed is:

1. Information device for a vehicle driver comprising at least one electronic central unit linked to a display screen and to geolocating means, and the electronic central unit being adapted to simultaneously run an operating system and a plurality of independently developed applications, including at least one geolocated application,
wherein at least one first application of said plurality of applications is adapted to be displayed on the screen while defining at least one window adapted to present a display controlled by a second application of said plurality of applications, said second application being independent of said first application, said first and second applications being from different vendors, said first application allowing or not allowing the possibility of having this window displayed and controlling only the size and the position of this window, whereas the second application controls entirely the content of said window,
wherein the display screen is a touch screen and said second application is adapted to also control an action following a user touch actuation on a graphical object displayed inside said window controlled by said second application,
in which said second application also controls the actual display of the window, and wherein the position of the window within the screen may be chosen by the user by means of a configuration application;
wherein the device also includes a control panel displayed on the screen comprising a plurality of graphical objects, each designating a corresponding one of the plurality of applications, said plurality of graphical objects being juxtaposed horizontally in a strip extending over the entire width of the screen;
this display screen has a display control area comprising at least two drop areas, the operating system being designed for a user to be able to select by a touch action a graphical object representative of an application from a menu of applications and place by a further touch action said graphical object in one of the drop areas thereby triggering the display of the application's user interface into said drop area, each of said drop areas corresponding to a predetermined display type,
wherein the control panel is caused to appear upon a user impulse on a button, and
wherein the control panel is caused to disappear at the earlier of a further user impulse on the button or a predetermined time elapsed without any action from the user on the control panel.

2. Device according to claim 1, in which the graphical object displayed in said window is a shortcut and said second application is adapted to be displayed on at least a portion of the screen following a touch actuation of said shortcut by a user.

3. Device according to claim 1, in which said window is adapted to display information communicated by the second application with a certain priority level, and the first application is adapted to allow the display of the window if said priority level is greater than a certain threshold priority level and to reject the display of the window if said priority level is below a certain threshold priority level.

4. Device according to claim 1, in which the display screen is a touch screen and the device also includes a control panel calling means adapted to have a control panel displayed on the screen comprising at least the menu of the applications and the display control area, the menu of the applications comprising graphical objects designating said applications and the display control area comprising drop areas, the operating system being designed for a user to be able to drag a graphical object representative of an application from the menu of the applications and place said graphical object in one of the drop areas, each of said drop areas corresponding to a predetermined display type.

5. Device according to claim 1, in which the second application uses an inter-application alert message to notify the first application about the content of the window to be displayed in the window.

6. Device according to claim 1, in which the second application is a roadside speed control radar signaling application.

7. Device according to claim 1, further comprising means for calling the control panel, in which the operating system is adapted to have the control panel displayed on the screen overlaid on data previously being displayed.

8. Device according to claim 1, in which the operating system is designed to have displayed in different screen portions, applications whose representative graphical objects are respectively placed in the drop areas of the display control area.

9. Device according to claim 1, in which the operating system is designed to have an application whose representative graphical object is placed in one of the drop areas of the display control area displayed immediately, said application being displayed according to the display type corresponding to said drop area and the control panel remaining initially overlaid on said application.

10. Device according to claim 1, in which the display control area includes at least first and second drop areas, the first and second areas respectively corresponding to displays of applications on two complementary screen portions.

11. Device according to claim 10, in which the screen is rectangular and has a smaller dimension, the two complementary screen portions sharing the screen according to a line of separation parallel to the smaller dimension of said screen and the operating system is designed for a user to be able to drag the line of separation by touch laterally toward one of the two screen portions, until the current application is made to disappear from this screen portion and to show only the current application on the other screen portion.

12. Device according to claim 10, in which the first and second drop areas respectively occupy the two complementary screen portions.

13. Device according to claim 10, in which the display control area also includes a third drop area and the operating system is designed to display, in full screen mode, an application whose representative graphical object is placed in said third drop area.

14. Device according to claim 10, in which said third drop area forms a boundary between the first and second drop areas.

15. Device according to claim 1, in which the selection and the placement of the graphical object representative of an application is a drag and drop operation.

16. Method for controlling an information device for a vehicle driver comprising at least one electronic central unit linked to a display screen and to geolocating means, and the electronic central unit being adapted to simultaneously run an operating system and a plurality of independently developed applications, including at least one geolocated application, wherein the display screen is a touch screen, the method comprising:
   the operating system and the plurality of independently developed applications are made to run simultaneously on the central unit,
   at least one first application of said plurality of applications is displayed on the screen, while defining at least one window adapted to present a display controlled by a second application of said plurality of applications, said second application being independent of said first application, and wherein said second application also controls the actual display of the window, said first and second applications being from different vendors, said first application allowing or not allowing the possibility of displaying this window and controlling only the size and the position of this window, whereas the second application controls entirely the content of said window,
   wherein the second application is adapted to control an action following a user touch actuation on a graphical object displayed inside said window entirely controlled by said second application,
   choosing, by the user by means of a configuration application, the position of the window within the screen, wherein the second application controls the actual display of the window,
wherein the device also includes a control panel displayed on the screen comprising a plurality of graphical objects, each designating a corresponding one of the plurality of applications, said plurality of graphical objects being juxtaposed in a strip extending over the entire width of the screen,
   the display screen has a display control area comprising at least two drop areas;
   the operating system being designed for a user to be able to select by a touch action a graphical object representative of an application from a menu of applications and place by a further touch action said graphical object in one of the drop areas thereby triggering the display of the application's user interface into said drop area, each of said drop areas corresponding to a predetermined display type,
   causing a control panel to appear upon a user impulse on a button, and
   causing the control panel to disappear at the earlier of a further user impulse on the button or a predetermined time elapsed without any action from the user on the control panel.

17. A processor configured to execute a computer program comprising instructions stored in a memory for implementing the method according to claim 16.

18. A non-transitory computer readable data medium comprising a computer program for implementing the method according to claim 16.

* * * * *